United States Patent [19]

Yoder

[11] Patent Number: 4,821,079
[45] Date of Patent: Apr. 11, 1989

[54] TEST PHOTOGRAPHIC IMAGE EASEL
[76] Inventor: Darrel K. Yoder, 502 S. Maple, Carlsbad, N. Mex. 88220
[21] Appl. No.: 111,666
[22] Filed: Oct. 23, 1987
[51] Int. Cl.⁴ .............................................. G03B 27/58
[52] U.S. Cl. ....................................... 355/74; 355/77; 355/40
[58] Field of Search ........................ 355/72, 74, 77, 40
[56] References Cited

U.S. PATENT DOCUMENTS

| | | | |
|---|---|---|---|
| 600,688 | 3/1898 | Goodwin | 355/72 |
| 1,113,549 | 10/1914 | Franke | 355/72 |
| 2,490,794 | 12/1949 | Florsheim | 355/72 |
| 3,588,248 | 6/1971 | Freund et al. | 355/74 |
| 4,190,356 | 2/1980 | Knapp | 355/74 |
| 4,603,967 | 8/1986 | Virtanen | 355/74 |

Primary Examiner—Monroe H. Hayes
Attorney, Agent, or Firm—H. Jay Spiegel

[57] ABSTRACT

The present invention relates to a device designed to enable one to make a series of photographic test prints of the same image or the same portion of an image on a single piece of photographic paper so that the test prints may be compared with one another to decide which combination of parameters will be used in the developing process. The parameters which may be selectively altered include density, color balance, lens aperture, filtration and length of exposure, among others. The invention utilizes a fixed base and a turntable and includes structure allowing the photographic paper to be rotated with respect to a fixed aperture fixedly aligned with the image of the negative or slide which is to be reproduced. Successive rotations of the photographic paper with respect to the aperture wherein changes in the above described parameters have been made before each exposure will result in a single piece of photographic paper having developed thereon the same portion of a photograph developed utilizing differing parameters. In this way, the optimum parameters for development may be determined.

8 Claims, 1 Drawing Sheet

TEST PHOTOGRAPHIC IMAGE EASEL

BACKGROUND OF THE INVENTION

In the prior art, photographic copies and enlargements are often made without prior testing of the particular parameters of development to optimize the finished photograph In such cases, the optimum parameters are not always chosen by the operator and, as such, optimum results are not always obtained A need has developed for an invention which will enable the operator to perform tests on a single portion of an image or of the entire image to optimize the conditions of exposure which are to be undertaken in developing the image.

U.S. Pat. No. 4,603,967 to Virtanen discloses a rotary disc test printing easel device wherein a photographic paper is fixedly placed within a base and a rotary turntable is mounted thereover having an aperture therein which may be rotated with respect to a fixed photographic negative or slide so that a plurality of small portions of the photographic paper may be sequentially developed utilizing varying development conditions to test for the most optimum conditions for exposure of a particular photographic image. As is well known to those skilled in the art, any single photograph includes areas having extreme differences in lightness and darkness, in shading and color, in contrast and focus. Thus, unless the same portion of an image or the entirety of the image is tested in each sequential test, it is virtually impossible to determine from the tests which conditions of exposure are most optimum for that particular photographic image entirety. Thus, the Virtanen device does not effectively operate to enable the operator to choose parameters for exposure since in the Virtanen device, different portions of a single image are sequentially exposed using different parameters under circumstances wherein the different portions of the image do not correspond in the various optical parameters with other portions of the image.

In comparing the different exposure parameters of a plurality of test prints, it is extremely critical that identical portions of the image be exposed and compared. Test prints which are identical as to location of image which result in such a case sere to control for variations in image density and/or color balance along an imaginary line drawn the length or width of the photographic image. Therefore, the variations in test prints made using such a technique are variations which have been selected by the operator and not through specific variations in the different regions of the single image.

As such, a need has developed for a testing device designed to test a single portion of an image or the entirety of the image through the use of a plurality of tests involving varying parameters of exposure so that the optimum parameters may be chosen from the resulting developed photographic paper. It is in this context that the present invention was developed.

SUMMARY OF THE INVENTION

The present invention overcomes the deficiencies found in the prior art and provides a new and improved test print easel device which enables the user to test the same region on a photographic image a plurality of different times utilizing different exposure parameters so as to enable the operator to determine the optimum conditions for exposure. The present invention includes the following interrelated aspects and features:

(a) In a first aspect, the subject invention includes a base upon which is mounted a rotary turntable having removably mountable thereon a piece of photographic paper.

(b) Mounted in overlying relation to the turntable is a mask having an aperture forming a portion of the circumference thereof which may be selectively covered by a wedge-shaped cover. Adjacent the center of the mask, a data imprinting device may be mounted to imprint on the photographic image information as to the photographic parameters which have been utilized to expose the portion of the photographic paper under the wedge-shaped slot.

(c) The mask includes a pivoting cover which carries the wedge-shaped slot and cover and which may be selectively pivoted to gain access to the turntable for the purpose of turning the turntable a selected increment of the circumference of a circle.

(d) In the operation of the subject invention, the position of the base and mask as well as the slot in the mask are maintained stationary with respect to the position and orientation of a photographic image, which is being tested. The turntable with photographic paper detachably mounted thereto may be rotated with respect to the base, mask and photographic image so that different pie-shaped portions of the photographic paper may be sequentially developed using differing development parameters. In this way, the same portion of a single photographic image may be exposed on a single piece of photographic paper a plurality of sequential times utilizing a plurality of differing exposure parameters so that, after the photographic paper has been rotated through a single revolution, having had a plurality of pie-shaped sections thereof exposed through differing exposure parameters, the photographic paper may be removed from the turntable and may be developed and then examined by the operator so that the optimum conditions of exposure may be easily determined.

Accordingly, it is a first object of the present invention to provide an improved test photographic image easel.

It is a further object of the present invention to provide an improved test photographic image easel which enables one to perform a plurality of exposure operations on a single region of a photographic image.

It is a still further object of the present invention to provide such a device wherein each sequential exposure is accomplished using unique combinations of exposure parameters so that the same portion of the photographic image may be exposed many different times on a single piece of photographic paper utilizing differing parameters so that the optimum exposure conditions may be tested.

These and other objects, aspects and features will be better understood from the following detailed description of the preferred embodiments when read in conjunction with the appended drawing figures.

SPECIFIC DESCRIPTION OF THE PREFERRED EMBODIMENTS

Figure 1:
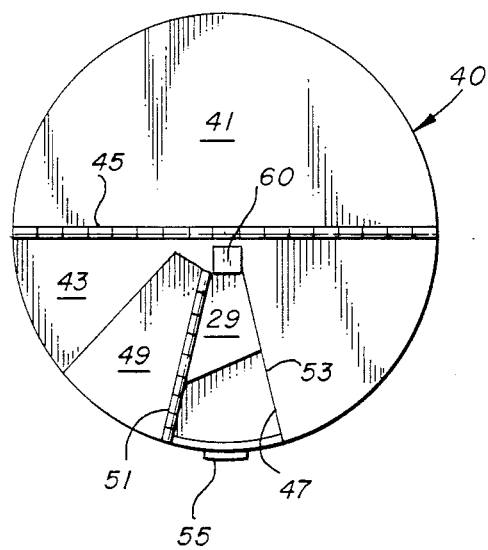
FIG. 1 shows a top view of the present invention.
Figure 2:
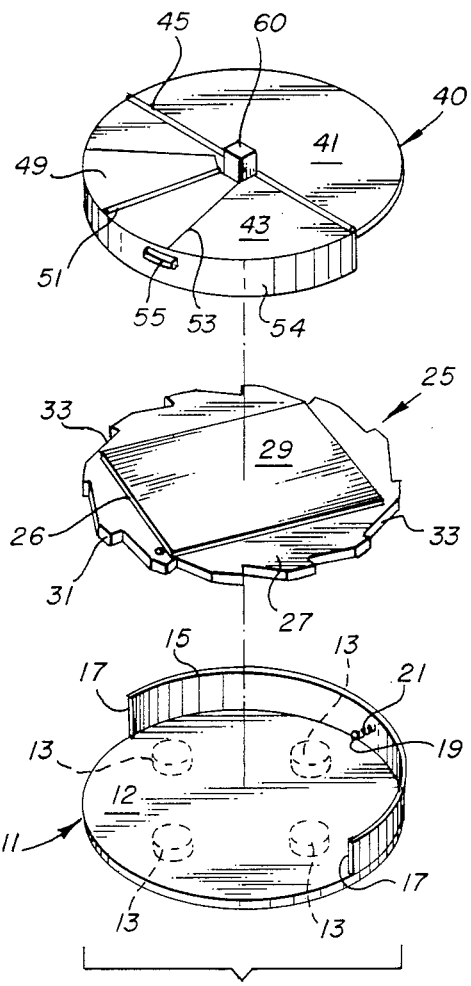
FIG. 2 shows an exploded perspective view of the present invention.
Figure 3:
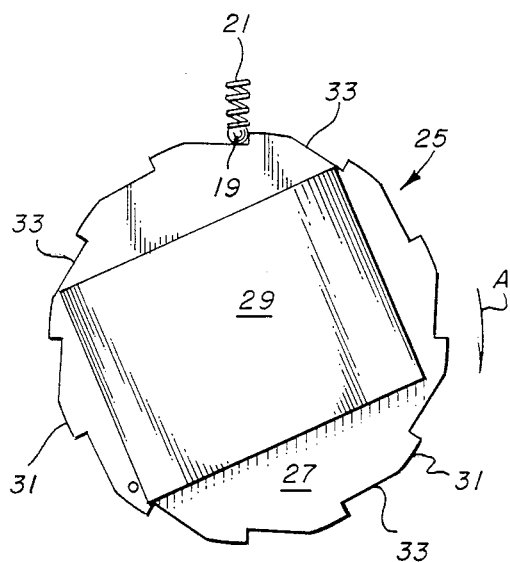
FIG. 3 shows a top view of the turntable portion of the present invention.

With reference to FIGS. 1-3, it is seen that the inventive easel 10 includes a base 11 having a flat floor 12 with a plurality of feet 13 mounted on the underside thereof designed to allow the base 11 to be placed on a flat surface in a fixed manner.

As best seen in FIG. 2, the base 11 includes an upstanding semi-cylindrical wall 15 having diametrically opposed ends 17 and a detent 19 biased therefrom through the use of a spring 21.

With reference to FIGS. 2 and 3 in particular, it is seen that rotatably mounted within the base 11 is a turntable 25 including a substantially flat surface 27 on which may be removably mounted a piece of photographic paper 29. As best seen in FIG. 3, the turntable 25 includes a periphery 31 having a plurality of triangular notches 33 cut therein which are designed to interact with the detent 19 through the bas of the spring 21 such that the turntable 25 may only rotate in a clockwise direction as depicted by the arrow A in FIG. 3. As should be understood by those skilled in the art, counterclockwise rotation of the turntable 25 will be prevented by the interaction of the detent 19 and the recesses 33.

As should be understood, the recesses 33 provide indication to the user that an incremental extent of rotation of the turntable 25 has taken place, and the circumferential distance between the recesses 33 is specifically provided for a purpose to be described in greater detail hereinafter.

The photographic paper 29 may be removably attached to the frame 26 on the surface 27 of the turntable 25 by any means such as mechanical fasteners, adhesives or the like.

With reference to FIGS. 1 and 2, it is seen that mounted in overlying relation to the base 11 and the turntable 25 is a mask 40 including a semi-circular flat surface 41 designed, in assembly, to overly the portion of the base 11 subtended by the wall 15, and a further surface 43 connected to the surface 41 by a hinge 45 allowing the surface 43 to be pivoted with respect the surface 41 as assembled on the wall 15 of the base 11.

With reference to FIGS. 1 and 2, it is seen that the surface 43 of the mask 40 has a pie-shaped slot 47 cut therein which may be selectively covered by a cover 49 pivoted along a hinge 51. As should be understood by those skilled in the art, a lip 53 is formed on the periphery of the slot 47 and acts as a seal which is light-tight when the cover 49 is pivoted in overlying position with respect thereto.

With reference to FIG. 2, it is seen that downwardly depending from the surface 43 is a substantially semi-cylindrical surface 54 which is adapted to combine with the surface 15 of the base 17 to provide a light-tight enclosure containing the turntable 25. Outwardly extending from the wall 54 is a tab 55 which is provided to facilitate the pivoting of the surface 43 about the hinge 45 with respect to the surface 41.

As seen in FIGS. 1 and 2, at the narrowest portion of the slot 47, a data imprinting device 60 is provided. Data imprinting devices are well known for use in other applications and the device 60 may be preprogrammed to print on the segment of the photographic paper which is exposed due to the opening of the cover 49 in the particular orientation of the turntable 25, information as to the particular exposure parameters which have been used in developing that particular portion of the photographic paper 29. In this way, as the turntable 25 is successively rotated to different engagements of differing recesses 33 with the detent 19, the device 60 may be reset to print the particular parameters which are to be used on the particular section of the photographic paper which is aligned under the slot 47. In this way, when the process which is carried out in accordance with the teachings of the present invention has been completed, the completely exposed photographic paper will have a plurality of wedge-shaped sections developed, each of which depicts the same portion of a photographic image exposed through the use of unique exposure parameters with those unique exposure parameters being imprinted on each wedge-shaped section through the use of the device 60.

The present invention having been described in detail, the operation of the present invention will be explained.

The operator of the invention follows a multi-step sequence for each test exposure. An enlarger device is prepared in a conventional manner to project an image onto the test print easel device 10. The image is focused on the turntable 25 with the device 10 being so placed under the enlarger that the most critical portion of the image is projected through the wedge-shaped slot 47 onto a portion of the turntable 25.

In total darkness with the enlarger turned off, the portion 43 of the mask 40 is pivoted about the hinge 45 and a piece of photographic paper is placed on the turntable 25 in a frame 26 sized to snugly receive the piece of photographic paper 29.

Thereafter, the portion 43 of the mask 40 is lowered onto the base 11 so that the walls 15 and 54 combine to provide a sealed chamber in which the photographic paper 29 is contained. The cover 49 is pivoted about the hinge 51 to overlying and sealing relation over the slot 4.

At this point in the procedure, room lights may be turned on so that initial exposure variables such as, for example, density, filtration, length of time of exposure, F-stop and the like may be selected and the enlarger may be manually adjusted to perform in accordance with the selected variables. After the variables are selected, their values are entered by the operator into the data imprinting device 60 which automatically imprints onto the photographic paper 29 the entered values with these values being imprinted on the portion of the photographic paper which is aligned under the slot 47.

With these values having been entered, the room lights are then turned off and the wedge-shaped cover 49 is opened.

The timer (not shown) which controls the enlarger is then activated by the operator in a conventional manner to expose the portion of the photographic paper 29 aligned under the wedge-shaped slot 47. Following exposure, the operator closes the wedge-shaped cover 49 and then lifts the front portion 43 of the mask 40 about the hinge 45 to expose the turntable 25 to view.

With the turntable 25 so exposed, it is rotated in the clockwise direction A shown in FIG. 3 until the detent 19 engages the next circumferentially spaced notch 33 in the turntable 25. This having been accomplished, the front portion 43 of the mask 40 is then lowered by pivoting about the hinge 45 and the room lights may then be turned by the operator.

The exposure parameters are then varied in a desired manner and the enlarger is adjusted accordingly by the operator. The operator then enters the new exposure parameter values into the data imprinting device 60 which is then operated to imprint these values on the section of the photographic paper 29 aligned under the wedge-shaped slot 47.

The above described process is repeated as many times as is desired to (1) expose all circumferential sections of the photographic paper 29, or (2) to expose sufficient circumferentially spaced sections of the photographic paper 29 to cause all desired combinations of photographic exposure parameters to have been tried.

After the procedure has been completed, the photographic paper 29 is removed from the turntable 25 in total darkness and is developed in a conventional manner.

If desired, a solenoid actuator may be attached to the wedge-shaped cover 49 which could be connected to the safe light outlet on the enlarger control timer in such a way that activation of the enlarger by the operator would automatically open the wedge-shaped cover 49 and deactivation of the enlarger by the timer would automatically close the cover 49.

Figure 4:
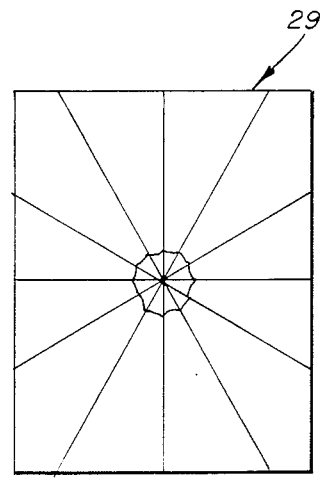
FIG. 4 shows a top view of a piece of photographic paper which has been exposed in accordance with the teachings of the present invention.

FIG. 4 illustrates a piece of photographic paper which has been exposed in accordance with the teachings of the present invention to provide twelve pie-shaped sections each of which has been exposed through the use of unique parameters of exposure through rotations of the turntable 25 so that each pie-shaped section of the photographic paper 29 includes substantially the same portion of the image of the photographic image.

As such, the present invention as disclosed hereinabove fulfills each and every one of the objects of the invention as set forth hereinabove and discloses an invention as embodied in apparatus and method which constitutes a vast improvement over the teachings of the prior art. Of course, various changes, modifications and alterations in the teachings of the present invention may be contemplated by those skilled in the art without departing from the intended spirit and scope thereof. Accordingly, it is intended that the present invention only be limited by the terms of the appended claims.

I claim:

1. A test photographic image easel comprising:
   (a) a stationary base having a turntable rotatably mounted thereon about an axis of rotation;
   (b) said turntable including frame means for releasably mounting a piece of photographic paper thereon;
   (c) a mask mounted on said base in overlying relation to said turntable and including a slot selectively closable by a cover said slot having a radially inner terminus spaced from said axis;
   (d) said easel being adapted to be placed in adjacency to an exposure mechanism with said base and mask being maintained in stationary relation to said exposure mechanism and with said turntable being selectively rotatable with respect to said base and mask to index different portions of said photographic paper into alignment with said slot; and
   (e) a data imprinting device on said mask between said axis and said radially inner terminus of said slot and being programmable to print information on said photographic paper related to particular parameters of exposure of said photographic paper, whereby when each said different portion of said photographic paper is indexed into alignment with said slot, said data imprinting device may be activated to print thereon the particular parameters of the exposure thereof for later review and comparison.

2. The invention of claim 1, wherein said cover is attached to said mask by a hinge allowing pivotable movements of said cover with respect to said mask between a first position covering said slot and a second position opening said slot.

3. The invention of claim 1, wherein said turntable has a notched periphery and said base has a detent mechanism mounted thereon and adapted to interact with said notched periphery to constrain rotation of said turntable in one direction of rotation.

4. The invention of claim 1, wherein said mask is of substantially circular configuration and includes two substantially semi-circular portions mutually pivotable about a hinge mechanism, said slot being located on one of said portions.

5. A method of making a series of photographic test prints including the steps of:
   (a) providing a mask device having a slot therein at a fixed location;
   (b) providing a turntable rotatable with respect to said fixed slot;
   (c) mounting a piece of photographic paper on said turntable;
   (d) exposing a portion of said photographic paper to a particular portion of an image through said slot under first parameters of exposure;
   (e) rotating said turntable with said photographic paper attached thereto align a further portion of said photographic paper with said slot;
   (f) exposing said particular portion of said image to said further portion of said photographic paper through said slot under second parameters of exposure; and
   (g) imprinting data on each said portion of said photographic paper regarding the said parameters of exposure thereof.

6. The method of claim 5, further including the step of maintaining darkness during said rotating step.

7. The method of claim 5, further wherein said step of imprinting data on said photographic paper is carried out after said rotating step.

8. The method of claim 5, further including the step of closing said slot after each exposing step.

* * * * *

UNITED STATES PATENT AND TRADEMARK OFFICE
CERTIFICATE OF CORRECTION

PATENT NO. : 4,821,079

DATED : APRIL 11, 1989

INVENTOR(S) : DARREL K. YODER

It is certified that error appears in the above-identified patent and that said Letters Patent is hereby corrected as shown below:

On the title page:
In the Abstract, Lines 6 and 7, delete "developing process" and insert --exposing of the finished photograph--;

Line 18, delete "developed" and insert --exposed--;

Line 19, delete "developed" and insert --exposed--;

Lines 20 and 21, delete "development" and insert --exposure--.

Signed and Sealed this

Thirtieth Day of October, 1990

Attest:

HARRY F. MANBECK. JR.

Attesting Officer

Commissioner of Patents and Trademarks